United States Patent [19]
Mogul

[11] Patent Number: 5,802,292
[45] Date of Patent: Sep. 1, 1998

[54] METHOD FOR PREDICTIVE PREFETCHING OF INFORMATION OVER A COMMUNICATIONS NETWORK

[75] Inventor: Jeffrey Clifford Mogul, Menlo Park, Calif.

[73] Assignee: Digital Equipment Corporation

[21] Appl. No.: 430,992

[22] Filed: Apr. 28, 1995

[51] Int. Cl.$^6$ .................................................. G06F 13/00
[52] U.S. Cl. .............................. 395/200.33; 395/200.49
[58] Field of Search ........................ 395/200.03, 200.33, 395/200.49, 200.47, 200.46

[56] References Cited

U.S. PATENT DOCUMENTS

| | | | |
|---|---|---|---|
| 4,885,778 | 12/1989 | Weiss | 380/48 |
| 5,134,563 | 7/1992 | Tayler et al. | 395/250 |
| 5,287,487 | 2/1994 | Priem et al. | 395/425 |
| 5,305,389 | 4/1994 | Palmer | 382/1 |
| 5,485,609 | 1/1996 | Vitter et al. | 395/600 |
| 5,553,276 | 9/1996 | Dean | 395/550 |
| 5,566,315 | 10/1996 | Milillo et al. | 395/440 |

OTHER PUBLICATIONS

J. Rice, "Interactive Mail Access Protocol–Version 3", Network Working Group, RFC 1203, Feb. 1991, pp. 1–49.

*Primary Examiner*—Mehmet B. Geckil
*Attorney, Agent, or Firm*—Ronald C. Hudgens

[57] ABSTRACT

A method for predictive prefetching of objects over a computer network including the steps of providing a client computer system, providing a server computer system, the server computer system having a memory, a network link to the client computer system, the network link also providing connection of the server computer system to the computer network, requesting from the server computer system by the client computer system a retrieval of a plurality of objects, retrieving the plurality of objects by the server system, storing the retrieval and an identity of the client computer system in the memory of the server computer system, sending the plurality of objects from the server computer system to the client computer system over the network link, predicting in the server computer system a plurality of subsequent retrieval requests from the client computer system according to a predetermined criteria, sending the prediction to the client computer system, and prefetching by the client computer system an object based on the prediction and other information. With such an arrangement, an object may be prefetched before a user actually requests it. This makes the retrieval latency appear to be zero when a user requests a prefetched object.

7 Claims, 2 Drawing Sheets

METHOD FOR PREDICTIVE PREFETCHING OF INFORMATION OVER A COMMUNICATIONS NETWORK

FIELD OF THE INVENTION

The present invention relates to computer networks, and more particularly, to a method for prefetching of information over a communications network.

BACKGROUND OF THE INVENTION

The World Wide Web (WWW) is a wide area hypermedia information retrieval initiative working to give easy, world-wide access to information via networked hypertext computer servers and clients. Hypertext is an information presentation methodology which allows highlighted words (or links) to point to other hypertext documents. The links are followed, for example, by pointing to the link and clicking, if one is using a personal computer (PC), workstation, or cursor keys on a computer terminal. Documents may contain plain text, images, video, audio, or postscript format files. The thing that makes the World Wide Web so powerful is that the networked clients know how to deal with the Internet and retrieve documents from anywhere in the world.

The WWW was developed primarily at CERN, the European Particle Physics Laboratory. The WWW is made up of networked computer servers and computer browsers (or clients). Servers are required if one wants to set up a repository of hypertext documents for others to access. A person wishing only to explore the WWW would typically only need a browser and TCP/IP connectivity.

People use the WWW because it gives quick and easy access to a tremendous variety of information in remote locations, known in the art as "Web Pages." Users in general do not like to wait for their results when accessing a web page. The users that are forced to wait will typically avoid using the web pages that take a long time to access or they will complain about web pages that take a long time to retrieve. Thus, web users are concerned about web latency.

Perceived web latency comes from several sources. Web servers can take a long time to process a request, especially if the web servers are overloaded or have slow disk drives. Web clients can add delay if they do not quickly parse the retrieved data and display it for the web user. Latency caused by web client or web server slowness, however, can in principle be solved simply be purchasing a faster computer, or faster disks, or more computer memory.

Web retrieval delay also depends on network latency. The WWW is useful because it provides remote access, but transmission of data across any distance takes time. Some of this delay depends on bandwidth; one cannot retrieve a 1 Mbyte datafile across a 1 Mbit/sec link in less than eight seconds. One could in principle reduce this time by purchasing a higher bandwidth link. However, much of the latency seen by WWW users comes from propagation delay, i.e., the speed of light is constant. For example, one cannot send one bit of information over three thousand miles in less than sixteen milliseconds.

Although one cannot reduce the actual retrieval latency for a web page, a method to improve perceived latency is desired. This method should prefetch a page (or other information object) before a user actually requests it. The object of this method would be to make the retrieval latency appear to be zero when a user requests a prefetched object.

As is known in the art, one can try to predict a user's behavior based on the user's past behavior. One such method is to prefetch files from a disk into a file system's cache based on previous access patterns to files. It may be possible to exploit this method locally to the server, i.e., to prefetch objects from the server's disk into the server's memory before the client requests them, but this would only provide a small performance benefit since most of the latency is in the network, and not the disk subsystem. It may also be possible to exploit this method locally to the client, i.e., the client software would observe a specific user's access patterns, and prefetch objects that it believes the user will want to look at. With this approach, network latency is hidden, but because the client can only observe a single user (or a small number of users on a timesharing system), it may not be able to build up a sufficiently large database of past observations and thus not be able to make many useful predictions. For example, if a particular user visits a web page she has never visited, the client will have no past observations on which to base a prediction about the next web page to be visited.

SUMMARY OF THE INVENTION

In accordance with the present invention, a method for predictive prefetching of objects over a computer network is provided including the steps of providing a client computer system, providing a server computer system, the server computer system having a memory, a network link to the client computer system, the network link also providing connection of the server computer system to the computer network, requesting from the server computer system by the client computer system a retrieval of a plurality of objects, retrieving the plurality of objects by the server system, storing the retrieval and an identity of the client computer system in the memory of the server computer system, sending the plurality of objects from the server computer system to the client computer system over the network link, predicting in the server computer system a subsequent retrieval request from the client computer system according to a predetermined criteria, sending the prediction to the client computer system, and prefetching by the client computer system an object based on the prediction and other information. With such an arrangement, an object could be prefetched before a user actually requests it. This makes the retrieval latency appear to be zero when a user requests a prefetched object.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
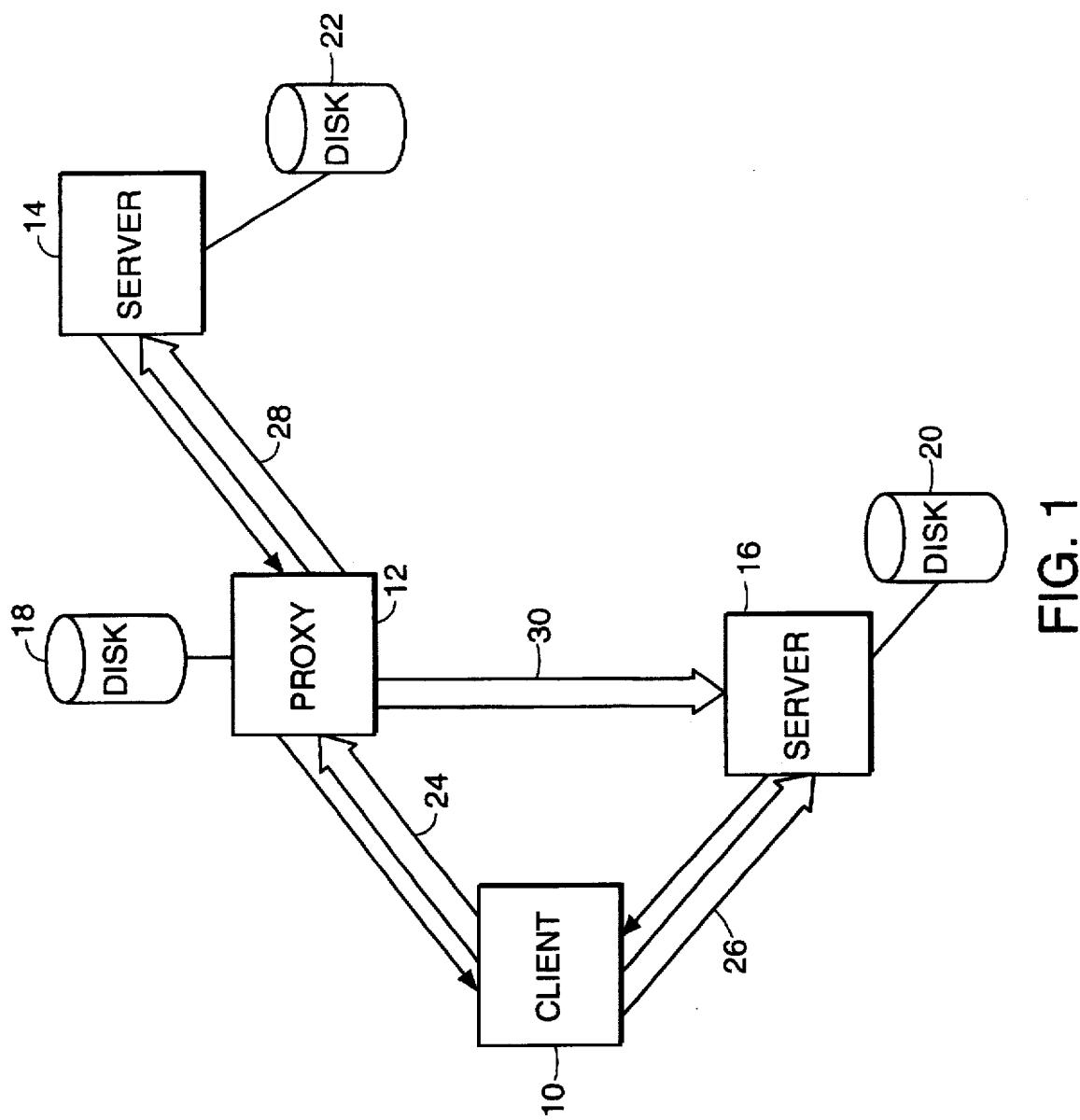
FIG. 1 is a block diagram of an exemplary computer network containing a client system, a proxy system, and two server systems.

Referring to FIG. 1, an exemplary network is shown to include a client system 10, a proxy system 12, and two server systems labeled as 14 and 16, respectively. The proxy system 12 is further shown to have a disk storage system 18, while the server system 16 is shown to have a disk storage system 20, and the server system 14 is shown as having a disk storage system 22. The client system 10 may or may not have a disk storage system. The server system 14 and server system 16 will almost always have a disk storage system associated with it. In general, proxy systems, such as the proxy system 12, act as relay systems between other computer systems within the exemplary network. Proxy systems are likely to have storage systems associated with them, especially if they have cache retrievals. All the computer systems illustrated in FIG. 1 are likely to have traditional cache memory hardware, i.e., a small amount of high-speed memory separate from the main memory. In the present invention, the term "cache" is also used to describe an area of memory, either main memory, or disk memory, or both, set aside to store recently retrieved files or network objects.

Typically, the server system 14 and the server system 16 will have a "file system cache" (not shown) in its main memory, to keep things it has recently retrieved from disk, under the assumption that the same file or network object will be requested again. The client system 10 may use the same technique to avoid re-retrieving files or network objects over the network. The proxy system 12 may do the same thing.

In FIG. 1, the thickness if the arrow head lines indicate the direction that a typical request will follow. In FIG. 1, a thick arrowhead line indicates the direction of a request, while a thin arrowhead line indicates the path where the server returns the requested file(s) or object(s) in reply to the requesting system. Thus, client system 10 is shown capable of making requests to proxy system 12 via link 24, and to server system 16 via link 26. The proxy system 12 is shown capable of making requests to server system 14 via link 28, and to server system 16 via link 30. It should be noted that server systems 14 and 16 never make requests. In addition, it is important to note that proxy systems typically do not have an original content, although they may store, i.e., cache, copies of objects retrieved from the server systems; server systems, such as server system 14 and server system 16, have original content which is usually stored on disk or constructed from data which is stored on disk.

As will be appreciated, client system 10 may request the retrieval of objects from any server system within the network. In addition, client system 10 may request the retrieval of more objects from server system 14, for example, than from server system 16, for example. Typically several users and/or client systems make requests for objects through any given server system. Thus, any server system is capable of observing the behavior of all of its own users, and proxy systems are capable of observing the behavior of many (but not all) users of many other servers.

In the present invention the server system 14, for example, predicts the client system's 10 one or more likely next retrieval requests, optionally assigns the predicted retrievals probabilities, and then transmits these predictions, not the actual objects, to the client system 10. This is typically done following a transmission of the most recently requested object or objects, so that the retrieval latency for that object or objects is not increased. Furthermore, the present invention allows the server system 14 to indicate each object's size and modification date (or timestamp) to help the client system 10 decide what to retrieve. The present invention takes advantage of the server system's 14 extensive observations of the behavior of many users, but allows the prefetching decision to be made in the client system 10.

After the server system 14 sends its predictions to the client system 10, the client system 10 looks at the predictions and, if the user has not made any explicit requests, the client system 10 may choose to ask the server system 14 for one or more of the predicted objects. The client system 10 may even choose to insert these requests after a series of previous requests, even though these requests may still be pending.

In accordance with the present invention, the client system 10 may make the decision to prefetch an object based on a number of criteria. These criteria include: (1) whether the object is already in the client system's 10 cache, and if so, if its modification timestamp is current; (2) whether the user on the client system 10 has been idle for more than a threshold interval; (3) the observed network bandwidth; (4) the size of the object; (5) user preferences; and (6) other heuristics or methods.

If the user on the client system 10 makes an explicit request for an object, other than one that is already being prefetched, while one or more prefetches are in progress, the client system 10 may signal to the server system 14 that the prefetch operation(s) should be aborted or suspended, and immediately transmit the user's explicit request(s). This avoids adding any latency to the user's explicit request(s). If the client system 10 and the server system 14 are able to suspend rather than abort a pending prefetch operation, after the explicit request is made, the client system 10 may signal the server system to continue with the suspended prefetch operation.

If the network path includes one or more proxy relays such as proxy system 12, the transmission of predictions from the server system 14 to the client system 10 and of prefetch requests from the client system 10 to the server system 14 may be done end-to-end, or over individual hops, or a combination of end-to-end and individual hops.

Figure 2:
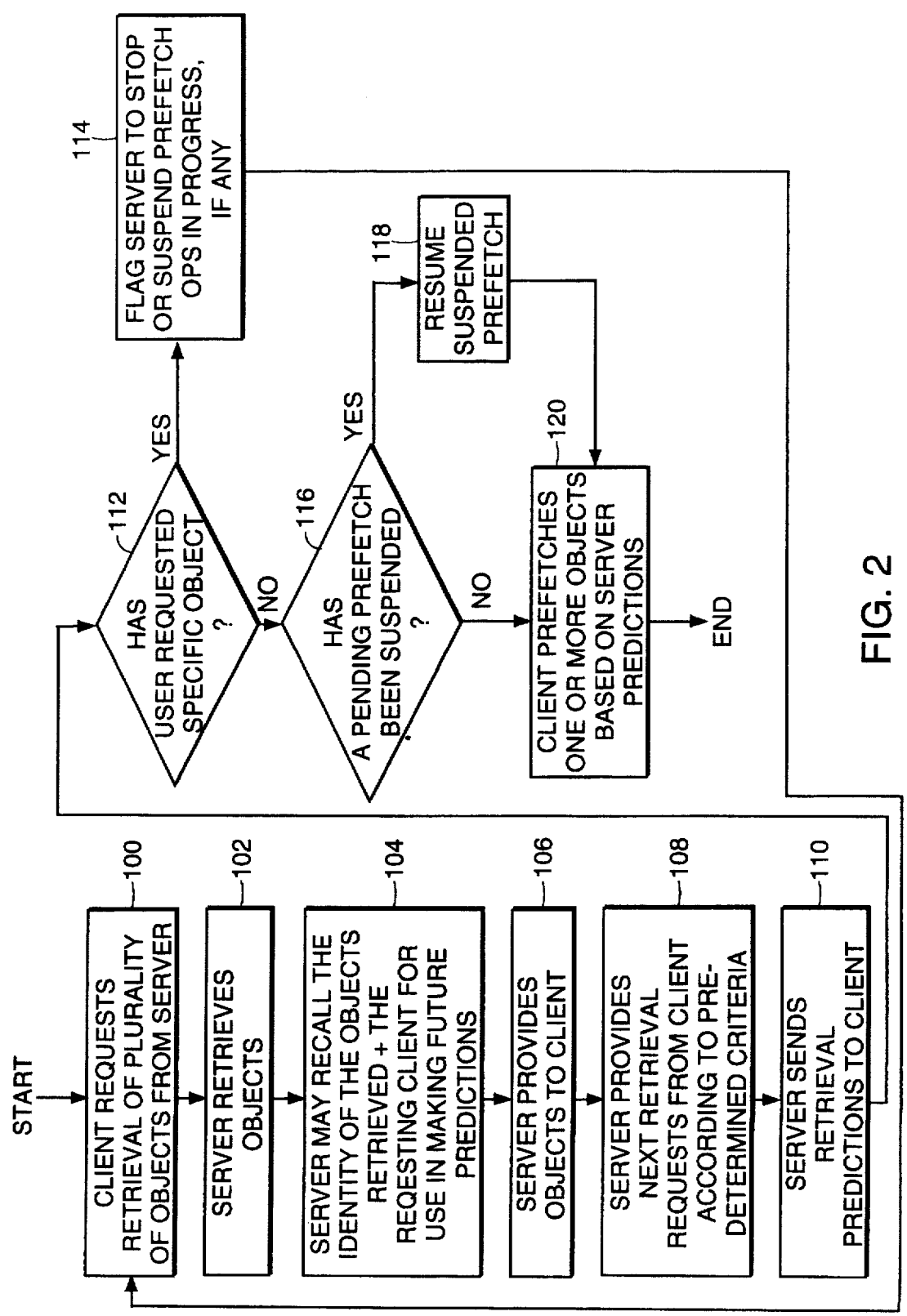
FIG. 2 is a flow diagram illustrating a prefetch method in accordance with the present invention.

Referring to FIG. 2, a flow diagram of the present invention is shown. At step 100, the client requests a retrieval of a plurality of objects. At step 102, the server retrieves the requested objects. At step 104, the server may record the identity of the objects retrieved and the requesting client for use in making future predictions. At step 106, the server provides the requested objects to the client. At step 108, the server predicts the next retrieval requests from the client according to predetermined criteria. At step 110, the server sends the retrieval predictions to the client. At step 112, the client determines whether a user has requested a specific object. If the user has made a request for a specific object, at step 114 the client flags the server to stop or suspend prefetch requests in progress, if any, and returns to step 100. If no user has made a request for a specific object, at step 116 the client determines whether any prefetch operation has been suspended. If so, then at step 118 the client signals the server to resume the suspended prefetch operation. If not, at step 120 the client prefetches one or more objects based on predictions from the server and local information.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method for predictive prefetching of objects over a computer network comprising the steps of:
   providing client computer systems;
   providing a server computer system, the server computer system having network links to the client computer systems;
   requesting from the server computer system by one of the client computer systems retrieval of an object;

sending the requested object from the server computer system to the requesting client computer system over its network link;

generating in the server computer system a list of predicted subsequent retrieval requests from the requesting client computer system based on previous requests by all the client computer systems recorded in the server computer system;

sending the list to the requesting client computer system; and prefetching by the client computer system an object from the list based on other information.

2. The method for predictive prefetching of objects over a computer network according to claim 1 wherein the other information is whether the object is already in a cache of the client computer system.

3. The method for predictive prefetching of objects over a computer network according to claim 1 wherein the other information is whether a user on the client computer system has been idle for more than a threshold interval.

4. The method for predictive prefetching of objects over a computer network according to claim 1 wherein the other information is a size of the object.

5. The method for predictive prefetching of objects over a computer network according to claim 1 wherein the step of prefetching by the client computer system an object based on the prediction further includes the steps of:

determining whether the client system has made a request for a specific object;

signalling the server system to suspend processing and transmission of the prefetch step to the client system;

fetching the specific object by the server computer system;

sending the specific object to the client computer system; and signalling the server system that processing and transmission of the prefetch step to the client computer system may resume.

6. A method for predictive prefetching of objects over a computer network comprising the steps of:

providing client computer systems;

providing a server computer system, the server computer system having network links to the client computer systems;

requesting from the server computer system by one of the client computer systems retrieval of an object;

sending the requested object from the server computer system to the requesting client computer system over its network link;

generating in the server computer system a list of predicted subsequent retrieval requests from the requesting client computer system based on previous requests by all the client computer systems recorded in the server computer system; and sending the list to the requesting client computer system.

7. A method for predictive prefetching of objects over a computer network for client computer systems connected by a network link to a server computer system comprising the steps of:

generating in the server computer system a list of predicted subsequent retrieval requests for objects from a request for an object sent by a client computer system the list being based on previous requests for the same object by all the client computer systems recorded in the server computer; and sending the list to the requesting client computer system.

* * * * *